(12) United States Patent
McCray et al.

(10) Patent No.: US 11,301,464 B2
(45) Date of Patent: Apr. 12, 2022

(54) ELECTRONIC MULTI-TENANT DATA MANAGEMENT SYSTEM

(71) Applicant: VideoAmp, Inc., Santa Monica, CA (US)

(72) Inventors: Ross Anthony McCray, Pacific Palisades, CA (US); Drew Hiroshi Kanoa Goya, Los Angeles, CA (US); Raja Ram Sankar, Venice, CA (US); Leo P. Chun, Los Angeles, CA (US)

(73) Assignee: VideoAmp, Inc., Santa Monica, CA (US)

( * ) Notice: Subject to any disclaimer, the term of this patent is extended or adjusted under 35 U.S.C. 154(b) by 154 days.

(21) Appl. No.: 16/742,721

(22) Filed: Jan. 14, 2020

(65) Prior Publication Data

US 2021/0216537 A1    Jul. 15, 2021

(51) Int. Cl.
| | |
|---|---|
| G06F 16/22 | (2019.01) |
| G06F 16/242 | (2019.01) |
| G06F 16/248 | (2019.01) |
| G06F 21/62 | (2013.01) |

(52) U.S. Cl.
CPC ........ *G06F 16/244* (2019.01); *G06F 16/2272* (2019.01); *G06F 16/248* (2019.01); *G06F 21/6218* (2013.01)

(58) Field of Classification Search
CPC .. G06F 16/244; G06F 16/248; G06F 16/2272; G06F 21/6218; G06F 16/25
See application file for complete search history.

(56) References Cited

U.S. PATENT DOCUMENTS

| | | | |
|---|---|---|---|
| 7,181,438 | B1 * | 2/2007 | Szabo ................. G06F 21/6245 |
| 2,392,391 | A1 | 6/2008 | Eibach et al. |
| 10,621,164 | B1 | 4/2020 | Kain |
| 10,950,020 | B2 | 3/2021 | Du |
| 10,970,419 | B1 | 4/2021 | Blum et al. |
| 11,157,944 | B2 | 10/2021 | Roullier |
| 2005/0076022 | A1 | 4/2005 | Wu et al. |
| 2005/0165744 | A1 | 7/2005 | Taylor et al. |
| 2007/0016583 | A1 | 1/2007 | Lempel et al. |

(Continued)

OTHER PUBLICATIONS

International Search Report and Written Opinion for PCT/US2021/013484 dated Apr. 22, 2021.
Office Action in U.S. Appl. No. 17/387,908 dated Nov. 16, 2021.

*Primary Examiner* — Jorge A Casanova
(74) *Attorney, Agent, or Firm* — Buchalter; Jason W. Croft

(57) ABSTRACT

A method may include obtaining a first data corpus and a second data corpus. The method may include correlating the first data corpus with the second data corpus. The method may include identifying a first rule and a second rule associated with performing searches. The method may include obtaining a first search query from a first data accessor to search the first data corpus and the second data corpus. The method may include validating that the first data accessor has permission to perform a search. The method may include obtaining first search results based on the first search query. The method may include validating the first search results based on the first rule and the second rule. The method may include transforming the first search results based on the first rule and the second rule. The method may include providing the transformed first search results to the first data accessor.

17 Claims, 6 Drawing Sheets

(56) References Cited

U.S. PATENT DOCUMENTS

| | | |
|---|---|---|
| 2007/0283425 A1 | 12/2007 | Ture et al. |
| 2010/0036884 A1 | 2/2010 | Brown |
| 2011/0202774 A1 | 8/2011 | Kratsch |
| 2012/0084666 A1 | 4/2012 | Hickman |
| 2012/0131075 A1 | 5/2012 | Mawdsley |
| 2013/0204886 A1 | 8/2013 | Faith et al. |
| 2013/0290234 A1 | 10/2013 | Hams et al. |
| 2014/0365363 A1 | 12/2014 | Knudsen et al. |
| 2015/0081562 A1 | 3/2015 | Roullier et al. |
| 2015/0081918 A1 | 3/2015 | Nowack |
| 2016/0050272 A1 | 2/2016 | Raduchel |
| 2017/0026343 A1 | 1/2017 | Wardman |
| 2017/0139965 A1 | 5/2017 | Marquardt et al. |
| 2018/0082237 A1 | 3/2018 | Nagel et al. |
| 2018/0113866 A1* | 4/2018 | Bendersky ............ G06F 16/337 |
| 2019/0026709 A1 | 1/2019 | Baron |
| 2019/0087835 A1 | 3/2019 | Schwed et al. |
| 2019/0147451 A1 | 5/2019 | Deutschmann et al. |
| 2019/0362083 A1 | 11/2019 | Ortiz et al. |
| 2019/0362101 A1 | 11/2019 | Fisse et al. |
| 2020/0067933 A1 | 2/2020 | Kukreja et al. |
| 2020/0244626 A1 | 7/2020 | Kwon et al. |
| 2021/0150269 A1 | 5/2021 | Choudhury et al. |
| 2021/0357393 A1 | 11/2021 | McCray et al. |
| 2021/0357394 A1 | 11/2021 | McCray et al. |
| 2021/0357395 A1 | 11/2021 | McCray et al. |

\* cited by examiner

ELECTRONIC MULTI-TENANT DATA MANAGEMENT SYSTEM

TECHNICAL FIELD

Embodiments of the present disclosure relate to the field of electronic multi-tenant data management systems.

BACKGROUND

Currently, managing data from multiple data providers presents a variety of problems including privacy requirements, regulatory and legal requirements, and resolution issues, making operations involving electronic multi-tenant data difficult.

SUMMARY

A method may include obtaining a first data corpus from a first data provider and a second data corpus from a second data provider. The method may also include correlating the first data corpus with the second data corpus based on a non-personally identifying identifier. The method may further include identifying a first rule associated with performing searches of the first data corpus. The method may also include identifying a second rule associated with performing searches of the second data corpus. The method may further include obtaining a first search query from a first data accessor to search the first data corpus and the second data corpus. The method may also include validating that the first data accessor has permission to perform a first search of the first data corpus and the second data corpus. The method may further include obtaining first search results from the first data corpus and the second data corpus based on the first search query in response to determining the first data accessor has permission to perform the first search of the first data corpus and the second data corpus. The method may also include validating the first search results based on the first rule and the second rule. The method may further include transforming the first search results based on the first rule and the second rule in response to the first search results satisfying the first rule and the second rule. The method may also include providing the transformed first search results to the first data accessor.

BRIEF DESCRIPTION OF THE DRAWINGS

Example embodiments will be described and explained with additional specificity and details through the use of the accompanying drawings in which.

DETAILED DESCRIPTION

Figure 1:
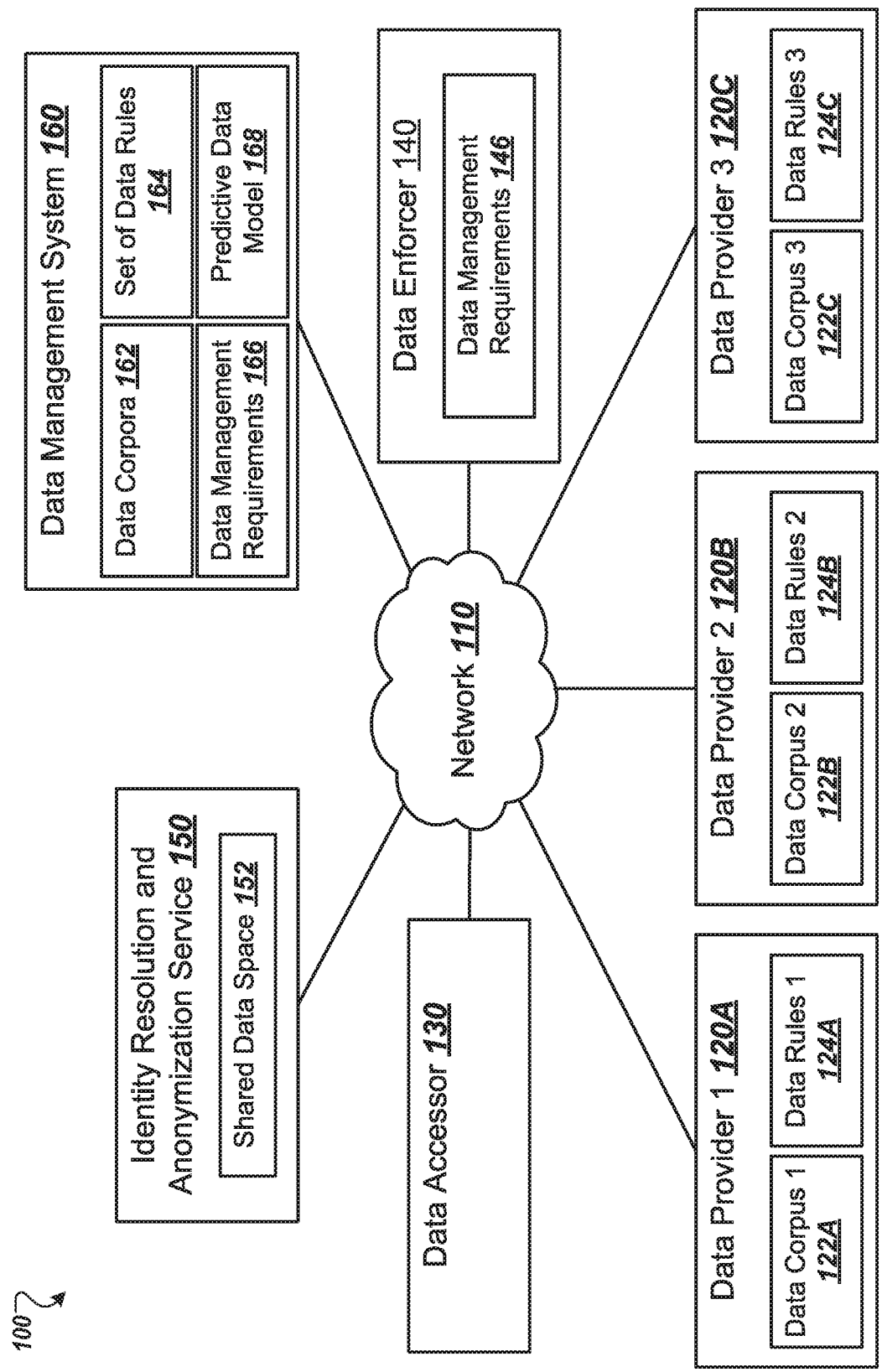
FIG. 1 illustrates an example environment related to an electronic multi-tenant data management system.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Users generate data across a variety of platforms. Each of these platforms may obtain data relative to particular habits and/or activities of users. For example, web-based shopping sites may obtain a shopping history of a user, a purchase history of a user, a search history of a user, browsing history of a user, and other information. A video streaming service may have a viewing history of a user, a search history of a user, customer ratings submitted by the user, and other information. A social media site may have a list of topics, pages, and/or companies that a user has "liked", subjects and content of posts by a user, a list of topics, pages, and/or companies that a user has "followed", comments submitted by a user, and other information. In today's digital age, users may interact with multiple platforms and services each day. The multiple platforms and services are typically owned and operated by different entities that do not share their data with others. It may be beneficial for companies to be able to search data from multiple different sources to identify a more full picture of user activity, identify trends for a user and among multiple users, improve the targeting of advertising for individuals, and/or measure how successful advertising campaigns are, among others.

However, searching and analyzing data across different companies, platforms, and services may be difficult and/or impossible for a variety of reasons. If user data is not hidden, encrypted or anonymized, companies may be hesitant to share their own data with competitors, particular when the data may help competitors target the companies' customers. For example, a social media site may have little incentive to share its collection of data about users with a video streaming company or a web-based shopping site. Additionally, legal restrictions, including privacy regulations, may regulate the dissemination or use of personally identifying information, preventing one company from sharing information it gathers with other companies.

Aspects of the present disclosure address these and other shortcomings of prior systems by improving the sharing of data across computing systems. The present disclosure provides an electronic multi-tenant data management system that entities can use to cross-share data among other entities, while still maintaining privacy of user information and company proprietary information. Using the electronic multi-tenant data management system, entities can have access to a more full set of data about a user and/or a set of users. This increased access may enable the companies to provide better electronic data services, such as advertising, to users. Additionally, electronic multi-tenant data management systems may facilitate the verification of compliance with regulatory restrictions on the sharing and use of information.

FIG. 1 illustrates an example environment 100 in which embodiments of the present disclosure can be implemented. The environment 100 may include a network 110, a data provider 1 120A, a data provider 2 120B, and a data provider 3 120C (collectively the data providers 120), a data accessor 130, a data enforcer 140, an identity resolution and anonymization service 150, and a data management system 160.

In some embodiments, the network 110 may include a public network (e.g., the Internet), a private network (e.g., a local area network (LAN) or a wide area network (WAN)), a wired network (e.g., an Ethernet network), a wireless network (e.g., an 802.11 network, Bluetooth network, or a Wi-Fi network), a cellular network (e.g., a Long Term Evolution (LTE) or LTE-Advanced network), routers, hubs, switches, server computers, and/or a combination thereof.

Each of the data providers 120, the data accessor 130, the data enforcer 140, the identity resolution and anonymization service 150, and the data management system 160 may be or include a computing device such as a personal computer (PC), a laptop, a server, a mobile phone, a smart phone, a tablet computer, a netbook computer, an e-reader, a personal digital assistant (PDA), or a cellular phone etc.

Although FIG. 1 depicts three data providers 120, in some embodiments the environment 100 may include any number of data providers 120. The data providers 120 may be associated with different entities that may generate and/or obtain data associated with users. For example, the data providers 120 may be associated with video streaming companies, web-based shopping companies, social media companies, search engines, e-commerce companies, and/or other any other type of company. For example, the data provider 1 120A may be associated with a video streaming company and/or platform, the data provider 2 120B may be associated with a web-based auction company, and the data provider 3 120C may be associated with a search engine.

Each of the data providers 120 may be configured to obtain data associated with users of services provided by the data providers 120. Continuing the above example, the data provider 1 120A may obtain data associated with a variety of customers as the data corpus 1 122A. The data corpus 1 122A may include user names, addresses, billing information, user preferences, user settings, user search histories, user viewing histories, user ratings, etc. For example, the data corpus 1 122A may include a listing of each video streamed by each user together with a time when each video was streamed, a location where each video was streamed, a number of times each video was streamed, any ratings submitted by a user associated with any videos streamed by the user, searches performed by the user, purchases made by the user, language settings of the user including subtitles, captions, language tracks, and other data of the user. In some embodiments, the data corpus 1 122A may correlate data with particular users based on a user's name, user identification, email address, billing information, etc.

Similarly, the data provider 2 120B may obtain data associated with a variety of customers as the data corpus 2 122B. The data corpus 2 122B may include similar data as the data corpus 1 122A but may be associated with, in this example, a web-based auction company. For example, the data corpus 2 122B may include a listing of each auction that is being tracked by each user, each bid and purchase made by each user, product ratings submitted by each user relative to purchases made by the user, buyer and/or seller ratings associated with each user, searches performed by each user, items each user has listed for sale, a user's physical location, etc. In some embodiments, the data corpus 2 122B may correlate data with particular users based on a user's name, user identification, email address, billing information, etc.

Similarly, the data provider 3 120C may obtain data associated with a variety of customers as the data corpus 3 122C. The data corpus 3 122C may include similar data as the data corpus 1 122A and the data corpus 2 122B but may be associated with, in this example, a search engine. For example, the data corpus 3 122C may include a listing of each search performed by each user, the sequence of each search performed by each user, a timing of each search performed by each user, each search result that is examined by each user (e.g. each search result that is opened, read, clicked, etc.), and other data. In some embodiments, the data corpus 3 122C may correlate data with particular users based on a user's name, user identification, email address, billing information, etc.

The data corpora 122 may additionally include other information such as, for example, tracked locations of user input (e.g., tracking where a user clicks, where a user moves a mouse, where a user drags a finger on a touchscreen), tracked keystrokes of users, tracked eye movement and eye focus of users, advertisements that are visited by each user, purchase and return history for each user, location of users, demographic information about users such as the users age, ethnicity, education level, income level, gender, etc. and other user data.

In situations in which the systems discussed here collect personal information about users, or may make use of personal information, the users may be provided with an opportunity to control whether programs or features collect user information (e.g., information about a user's social network, social actions, interactions or activities, profession, a user's preferences, a user's viewing history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data corpora 122 may be shared, on a full or limited basis, to the data management system 160. Each of the data providers 120 may also include corresponding data rules 124 that dictate how the respective data corpus may be shared, used, access, etc. by other data providers 120 that can access the data management system. 160. For example, the data provider 1 120A may include data rules 1 124A, the data provider 2 120B may include data rules 2 124B, and the data provider 3 120C may include data rules 3 124C. The data rules 124 may include restrictions on access to the data corpora 122. For example, the data rules 1 124A may include rules established by the data provider 1 120A for accessing the data corpus 1 122A. The data rules 1 124A may include a list of individuals, corporations, and/or entities who may access the data corpus 1 122A via the data management system 160. Additionally or alternatively, in some embodiments, the data rules 1 124A may include a permission list which may grant different individuals, corporations, and/or entities different levels of access to the data corpus 1 122A. For example, a first entity may have full access while a second entity may only have access to a subset of the data corpus 1 122A.

The data rules 1 124A may also include privacy requirements. For example, the privacy requirements may include a requirement for a minimum number of user data to be disclosed in response to a search query such as a minimum bin aggregation rule. For example, the minimum bin aggregation may be 100 users. The user data may be shared on an individual basis, or the user data may be aggregated. If a search results in fewer than 100 results, the search results of the data corpus 1 122A may not be disclosed as the number of search results may not satisfy the minimum bin aggregation rule. Additionally or alternatively, if the search results in fewer than 100 results, the search results of the data corpus 1 122A may not be aggregated and the aggregated data may not be shared. In at least one embodiment, user data that is shared is anonymized and personally identifiable user information is removed and/or hidden from being identified by data providers other than the data provider that is sharing the data. In some embodiments, search results may need to satisfy multiple data rules 124 such as the data rules 1 124A and the data rules 2 124B. In these and other embodiments, the data rules 1 124A may include a first minimum bin aggregation rule and the data rules 2 124B may include a second minimum bin aggregation rule. If the first minimum bin aggregation rule is stricter (i.e., greater) than the second minimum bin aggregation rule, the search results may only need to satisfy the first minimum bin aggregation rule.

The data rules 1 124A may also include data transformation rules. For example, the data transformation rules may include a requirement for grouping of search results into bins. For example, in response to a search query, results from the data corpus 1 122A may be grouped into bins of a particular size and/or the number of search results may be rounded to the nearest bin size. When the bin size is 30, the results may be rounded to the nearest 30. Alternatively or additionally, in some embodiments, data transformations may include fuzzing of data. For example, rather than providing exact values for data included in the data corpus 1 122A, the data management system 160 may provide the values of the data modified by a relatively small random amount, or data that has been aggregated.

Each of the data providers 120 may provide its corresponding data corpus 122 and data rules 124 to the data management system 160 and may be subject to the respective data rules 124.

The data accessor 130 may be associated with any entity, including the same or different entities associated with the data providers 120. In some embodiments, the data accessor 130 may be granted permission to perform searches of one or more the data corpora 122 via the data management system 160. In these and other embodiments, the data accessor 130 may be listed as a party that may access the data corpora 122 subject to the data rules 124. In some embodiments, the data accessor 130 may have access to search some data corpora 122 and may not have access to search other data corpora 122. For example, the data rules 1 124A and data rules 2 124B may list the data accessor 130 as an entity that may perform searches of the data corpus 1 122A and the data corpus 2 122B while the data rules 3 124C do not list the data accessor 130 as a permissioned party. Thus, when attempting to perform a search using the data management system 160, the search results may not include results associated with the data corpus 3 122C.

The data enforcer 140 may be associated with a third-party such as, for example, a government entity. For example, the data enforcer 140 may be associated with a regulatory body that works to ensure that data gathered by the data providers 120 and accessed by the data providers 120 and/or the data accessor 130 conform to data management requirements 146. For example, in some jurisdictions, the data management requirements 146 may not permit the gathering of data from minors without consent. Alternatively, in some embodiments, the data management requirements 146 may not permit targeted advertising to minors or to others. Additionally or alternatively, in some jurisdictions, data management requirements 146 may not permit the dissemination of personally identifying information by the party that gathered it to other parties. For example, in some jurisdictions, the data management requirements 146 may allow the data provider 1 120A to gather personally identifying information for use in billing, providing services, etc. but may not allow the data provider 1 120A to sell or distribute that data to other parties. The data enforcer 140 may use the data management system 160 to verify compliance with the data management requirements 146.

The identity resolution and anonymization service 150 may be configured to obscure and/or remove any personally identifying information of the data corpora 122 prior to transmittal of the data corpora 122 to the data management system 160. In some embodiments, the identity resolution and anonymization service 150 may associate the data of the data corpora 122 with an identifier through a process (e.g., a one-way process) such that information from two different data corpora 122 associated with a particular individual may be correlated with each other without revealing the identity of the particular individual. For example, the identity resolution and anonymization service 150 may anonymize and/or remove from the data corpora 122 names, physical addresses, Internet Protocol (IP) addresses, phone numbers, email addresses, credit records, billing information, etc. In some embodiments, the identity resolution and anonymization service 150 may anonymize the data corpora 122 such that the anonymized identifier of a particular user is the same across each of the data corpora 122 in which the particular user's data appears. In some embodiments, the identity resolution and anonymization service 150 may use a live random access memory (RAM) internal identification to generate the anonymized identifier.

In some embodiments, the identity resolution and anonymization service 150 may attempt to protect personally identifiable information by being configured to act as a service account 152 with restricted access. For example, two data providers 120 may desire to share their respective data corpora 122 with one another. The two data providers 120 may then enter into a contract to share data. Responsive to receiving a request from both data providers 120 to create a shared data space 152, the identity resolution and anonymization service 150 may create the shared data space 152. The shared data space 152 may be accessed using one or more of a service account and an encryption key. The shared data space 152 may include some or all of the respective data corpora 122 from both of the data providers 120. Access to the shared data space 152 may be restricted using the service account. Additionally or alternatively, access to the shared data space 152 may be restricted using the encryption key. The encryption key, for example, may limit access only to those data providers 120 that have entered into a contract with one another. Further, an encryption key may only provide one-way access to the data providers 120 that have access to the key. Additionally, an encryption key may be generated by Hash-based Message Authentication Code (HMAC), Advanced Encryption Standard (AES), Rivest-Shamir-Adleman (RSA), Triple Data Encryption Standard (TripleDES), or any other method for encrypting data. Data providers 120 that have an encryption key and access to a service account 152 may desire to have additional data providers 120 and their data corpora 122 joined to the service account 152 In such scenario, a third data provider 120 may be provided an encryption key that grants access to the service account 152 already created by the first two data providers 120. In at least one embodiment, the encryption key is shared after permission is given by all data providers that currently have access to the encryption key.

The data management system 160 may be configured to receive the data corpora 122 from each of the data providers 120 and correlate the data corpora 122 with each other as the data corpora 162. In some embodiments, the data management system 160 may obtain the data corpora 122 after the identity resolution and anonymization service 150 has anonymized any personally identifying information from the data corpora 122. In some embodiments, the data corpora 162 may include an identification of the source of the data, i.e. whether a particular data corpus of the data corpora 162 came from data provider 1 120A, data provider 2 120B, and/or data provider 3 120C. The data management system 160 may identify and correlate data associated with a user, or a group of users in the data corpora 162 and store the correlated data as a searchable record or index.

In some embodiments, the data management system 160 may correlate the data corpora 122 using a non-personally identifying identifier. For example, each of the data corpora 122 may include multiple groups of data, each group of data associated with a particular non-personally identifying identifier. As described above, the non-personally identifying identifiers may be generated by the identity resolution and anonymization service 150. The non-personally identifying identifiers may be generated in such a way that the same non-personally identifying identifier is generated for a group of data associated with a particular individual regardless of whether the group of data is in the data corpus 1 122A, the data corpus 2 122B, or the data corpus 3 122C. The data management system 160 may thus correlate the data corpora by identifying a first group of data in the data corpus 1 122A associated with a particular non-personally identifying identifier, a second group of data in the data corpus 2 122B associated with the same particular non-personally identifying identifier, and a third group of data in the data corpus 3 122C associated with the same particular non-personally identifying identifier, and then correlating the first group of data with the second group of data and the third group of data.

The data management system 160 may be configured to obtain the data rules 124 from each of the data providers 120 as the set of data rules 164. In some embodiments, the set of data rules 164 may include an identification of the source of the data rules, i.e. whether particular data rules of the set of data rules 164 came from data provider 1 120A, data provider 2 120B, and/or data provider 3 120C.

The data management system 160 may be configured to obtain the data management requirements 146 from the data enforcer 140 as the data management requirements 166.

The data management system 160 may be configured to process, verify, and/or validate search queries received from the data providers 120, the data accessor 130, and/or the data enforcer 140 to search the data corpora 162 using the set of data rules 164 and the data management requirements 166 as described below relative to FIG. 2. In some embodiments, the data management system 160 may also be configured to grant access to the data enforcer 140 to verify compliance with the data management requirements 166, to verify the contents of the data corpora 162.

The data management system 160 may be configured to generate a predictive data model 168 of the data corpora 162. The predictive data model 168 may be generated using machine learning and predictive analytics on the data corpora 162. For example, a generative adversarial network (GAN) or a privacy-preserving adversarial network (PPAN) may be applied to the data corpora 162 to generate the predictive data model 168 based on the data corpora 162. Additionally, the predictive data model 168 may be trained on the real data sets contained in the "virtual clean room" or service account 152, which may limit access to the predictive data model 168 to those data providers 120 that have an encryption key to the service account 152, and which may restrict data providers 120 from creating their own model on the actual data in the service account 152. The predictive data model 168 may be used for data providers 120 to predict behaviors, tendencies, and/or trends related to the data corpora 162 that is aggregated in the data management system 160. The predictive data model 168 may allow an individual data provider 120 a more accurate predictive model by combining data corpora 162 from more than one different data providers 120. Additionally, the predictive data model 168 may allow the service account 152 to maintain the privacy of the data corpora 162 by not allowing data providers 120 to develop their own predictive data models on the data corpora 162. For example, data provider 1 120A may provide data corpus 1 122A to a service account 152 and data provider 2 120B may provide data corpus 2 122B to the same service account 152. A predictive data model 168 may be generated on the combined data corpora 162 that data provider 1 120A and data provider 2 120B have contributed, without disclosing all the data to either of the data providers 120. The predictive data model 168 may be more accurate and complete than any one data provider 120 could develop on their own data corpora 122.

Additions, deletions, and modifications may be made to the environment 100 of FIG. 1. In some embodiments, the environment 100 may include more or fewer than three data providers 120. Alternatively or additionally, in some embodiments, the environment 100 may not include a data accessor 130 or may include multiple data accessors 130. Alternatively or additionally, in some embodiments, the data accessor 130 may be the same entity as one or more of the data providers 120. In some embodiments, the environment 100 may not include the data enforcer 140 or may include multiple data enforcers 140. For example, in these and other embodiments, the environment 100 may include multiple data enforcers 140 and each data enforcer 140 may correspond with a particular jurisdiction and may include data management requirements 146 associated with the particular jurisdiction.

In some embodiments, the environment 100 may not include the identity resolution and anonymization service 150. In these and other embodiments, each data provider 120 may perform its own data anonymization to remove personally identifying information from its respective data corpus 122. Alternatively or additionally, the data management system 160 may perform the removing of personally identifying information from the data corpora 122.

Figure 2:
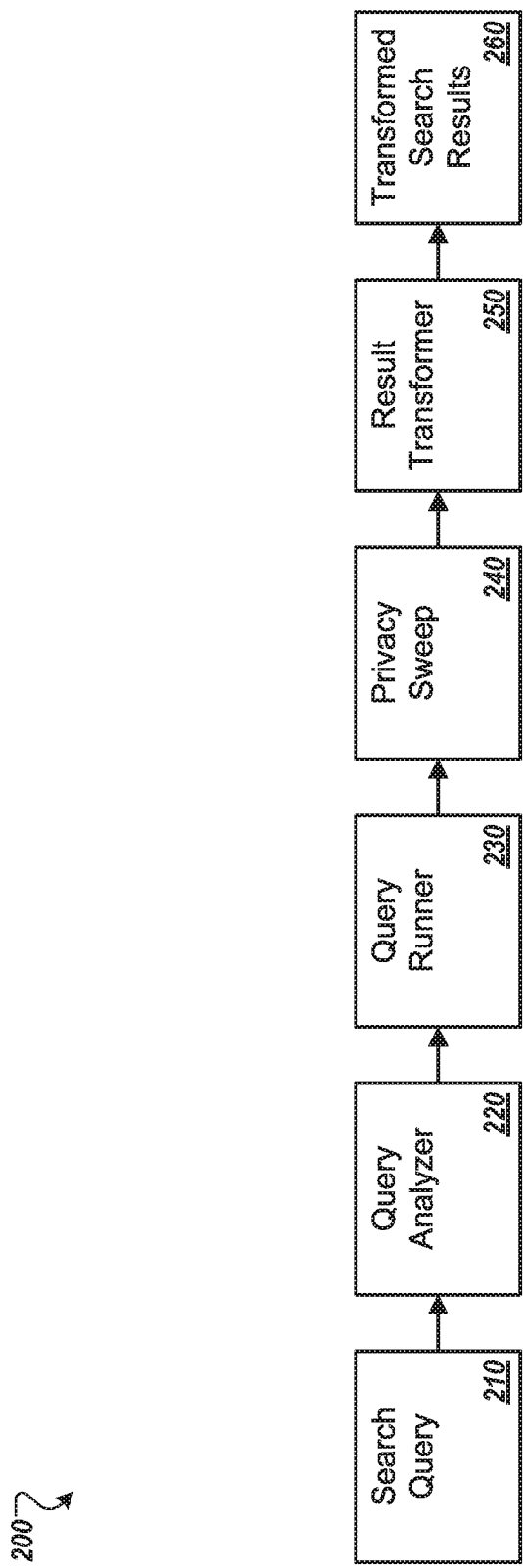
FIG. 2 illustrates an example system related to performing a search in an electronic multi-tenant data management system.

FIG. 2 illustrates an example system 200 related to performing a search in an electronic multi-tenant data management system. The system 200 may correspond with the data management system 160 of FIG. 1. In some embodiments, the system 200 may include a query analyzer 220, a query runner 230, a privacy sweep 240, and a result transformer 250.

The query analyzer 220 may include a circuit, code and/or computer instructions configured to operate the query analyzer 220 to receive a search query 210 and analyze the search query 210. The search query 210 may include a request to search for users of particular services at particular locations. The search query 210 may include a request to search any data corpora such as the data corpora 122 and/or data corpora 162 of FIG. 1. For example, the search query 210 may request a search of the data corpus associated with a particular data provider, such as the data corpus 1 122A associated with the data provider 1 120A of FIG. 1. In some embodiments, the query analyzer 220 may analyze the search query 210 based a set of data rules, such as the set of data rules 164 of FIG. 1, and based on data management requirements, such as the data management requirements 166 of FIG. 1. For example, a data accessor may submit a search query 210 that may request that a search be performed of the data corpus associated with a particular data provider. However, the data rules associated with the particular data provider may not authorize the data accessor to perform searches of the data corpus. The query analyzer may thus validate whether the data accessor has permission to perform a search of the data corpora listed in the search query 210.

If the query analyzer 220 determines that the search query 210 is not authorized, the query analyzer 220 may provide a message to the originator of the search query 210 indicating that the search failed and/or was not authorized. If the query analyzer 220 determines that the search query 210 is authorized and/or that the data accessor has permission to perform a search of the data corpora referenced in the search query 210, the query analyzer 220 may provide the search query 210 to the query runner 230.

The query runner 230 may include a circuit, code and/or computer instructions configured to operate the query runner 230 to run the search query 210. The query runner 230 may perform a search using the search query 210 over the associated data corpora. As described, the search query 210 may include a list of data corpora to search and a list of terms, locations, data fields, etc. over which to search. The query runner 230 may perform the search using the search query 210 and may obtain search results from the data corpora referenced in the search query 210 and may provide the search results to the privacy sweep 240. For example, if the search query 210 includes a particular location and a particular behavior, the query runner 230 may identify all data in the data corpora that include the particular location and the particular behavior.

The privacy sweep 240 may include a circuit, code and/or computer instructions configured to operate the privacy sweep 240. The privacy sweep 240 may perform one or more operations on the search results to verify conformance with the data rules and/or data management requirements. For example, the number of search results may be lower than a required minimum number of search results as set by a data provider in a data rule. For example, the search query 210 may request to search the data corpus of a first data provider and the first data provider may have a data rule requiring at least one hundred results. If the number of results of performing a search using the search query 210 is less than one hundred, the privacy sweep 240 may indicate that the search using the search query 210 has failed the data rules and may return a message indicating that the search failed to the originator of the search query 210. In some embodiments, the privacy sweep 240 may perform multiple sweeps of the results of the search query 210. For example, in some embodiments, the privacy sweep 240 may perform a sweep for each data corpus which was searched using the search query 210. Thus, the privacy sweep 240 may validate the results of the search query 210 based on rules associated with each data corpus. For example, the search query 210 may request a search of the data corpus from a first data provider, the data corpus from a second data provider, and the data corpus from a third data provider. The privacy sweep 240 may perform a first sweep of the search results using the data rules of the first data provider, a second sweep of the search results using the data rules of the second data provider, and a third sweep of the search results using the data rules of the third data provider. In some embodiments, the privacy sweep 240 may also perform a sweep of the search results using the data management requirements. For example, the privacy sweep 240 may determine whether the search results include any personally identifying information.

If the privacy sweep 240 determines that the search results satisfy all of the relevant data rules and the data management requirements, the privacy sweep 240 may provide the search results to the result transformer 250. In at least one embodiment, failing to satisfy even one of many rules may cause the privacy sweep 240 to not provide (or not authorize provision of) the search results. The result transformer 250 may perform alterations to the data based on the data rules. For example, the data rules associated with one or more data providers may require that the data be fuzzed. As an example of fuzzing the data, a small and/or random amount may be added or subtracted from at least one portion of the actual search results. For example, if the data from a data provider include ad exposure data and the data provider has a rule that ad exposure data must be fuzzed by five minutes, each search result with ad exposure data may have a random amount from −5 minutes to +5 minutes added to the ad exposure data. Other data may also be fuzzed. For example, ages of individuals may be fuzzed by a year, by two years, or by any number of years. As an additional example of data rules, a data rule may require that data be grouped into buckets of a particular amount. For example, if the search results indicate that 97 users satisfy the search query and the data rule requires buckets of 30, the search results may be transformed to indicate that 90 users satisfy the search query. After performing transformations of the search results, the result transformer 250 may output transformed search results 260. In some embodiments, the result transformer 250 may provide the transformed search results 260 to the party that provided the search query 210 to the query analyzer 220.

Alternatively or additionally, in some embodiments, the transformed search results 260 may be used to identify potential targets for advertising. For example, the transformed search results 260 may include demographic information, subjects that are "liked" or "favorited", past purchase information, geographic information, frequency of use, and other information that may be used by a company to devise a marketing strategy. For example, a company may target particular channels, social media sites, and or topics to improve its visibility among segments of the population that are more likely to be interested in its products.

Alternatively or additionally, in some embodiments, the transformed search results 260 may be used in the creation of new products. For example, as described above, the transformed search results 260 may include a viewing history of the movies and/or television shows that individuals in a particular demographic have watched. By identifying common movies and/or television shows, a television producer may create a new television series to cater to the particular demographic.

Alternatively or additionally, in some embodiments, the transformed search results 260 may be used to identify segments of the population that may be at risk for physical and/or emotional disorders. For example, the transformed search results 260 may include information about individuals with a particular disorder. Using the customer data associated with these individuals, a health agency may identify particular character traits, interests, purchase histories, streaming histories, or other details that may correlate with the particular disorder.

Alternatively or additionally, in some embodiments, the transformed search results 260 may be provided to a data enforcer, such as the data enforcer 140 of FIG. 1. The search query 210 may also be provided to the data enforcer. In these and other embodiments, the data enforcer may also have access to the data corpora. The data enforcer may thus verify that the data management requirements are being satisfied.

Alternatively or additionally, in some embodiments, the transformed search results 260 may be provided to a data provider, such as the data provider 1 120A of FIG. 1. The data provider may have access to verify the search query 210, the data accessor who requested the search query 210, and the transformed search results 260.

In some embodiments, the search query 210 may include a request to search some data corpora but not others. In these and other embodiments, the query analyzer 220 may only validate the search query 210 based on data rules associated with the data corpora that the search query 210 requests to search. Similarly, the privacy sweep 240 may only perform sweeps relative to the data rules associated with the data corpora that are searched. Similarly, result transformer 250 may only transform the search results based on data rules associated with the data corpora that are searched.

Figure 3A:
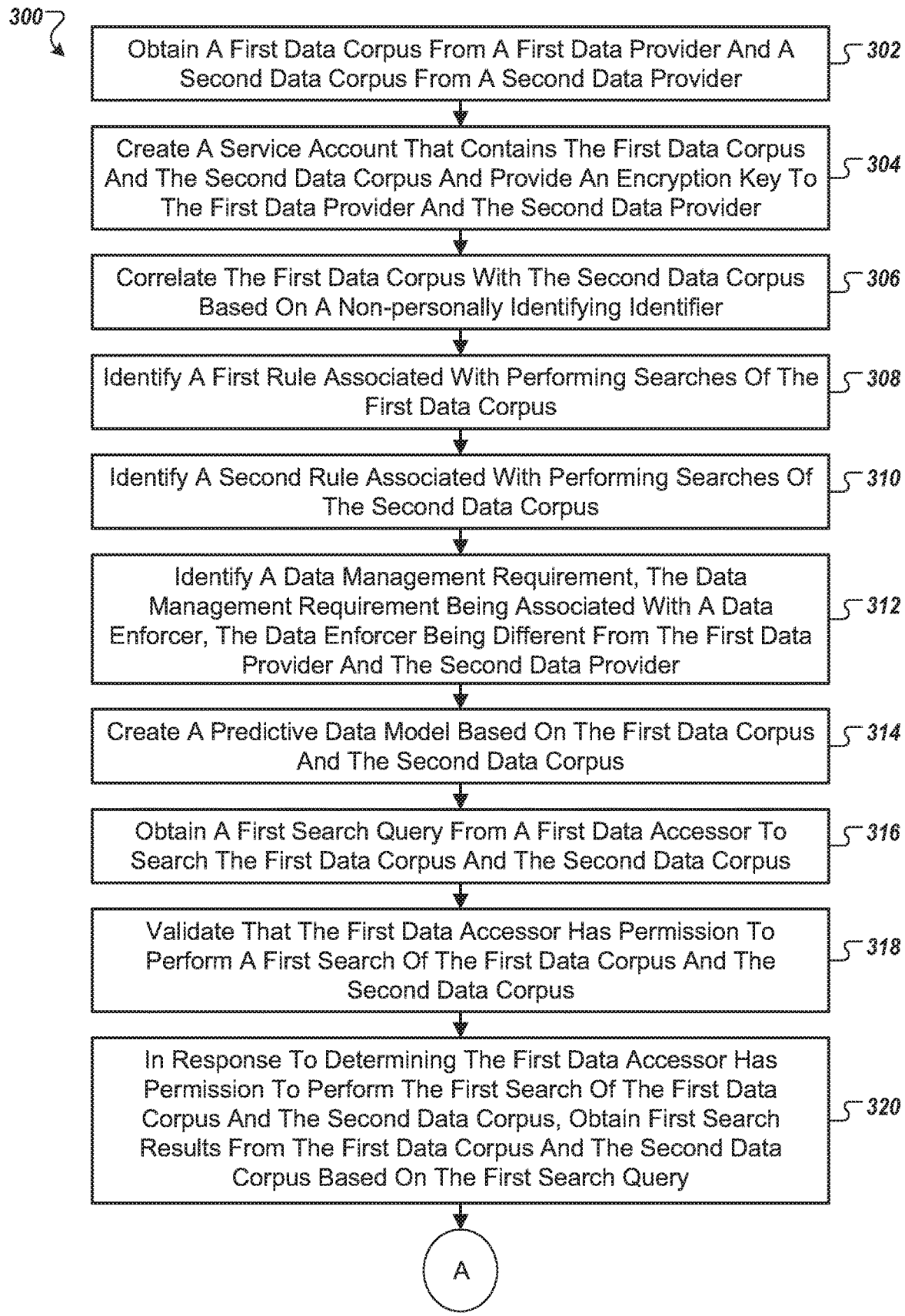
FIGS. 3A-3C illustrate example flow diagrams of an example computer-implemented method to perform a search of an electronic multi-tenant data management system.
Figure 3B:
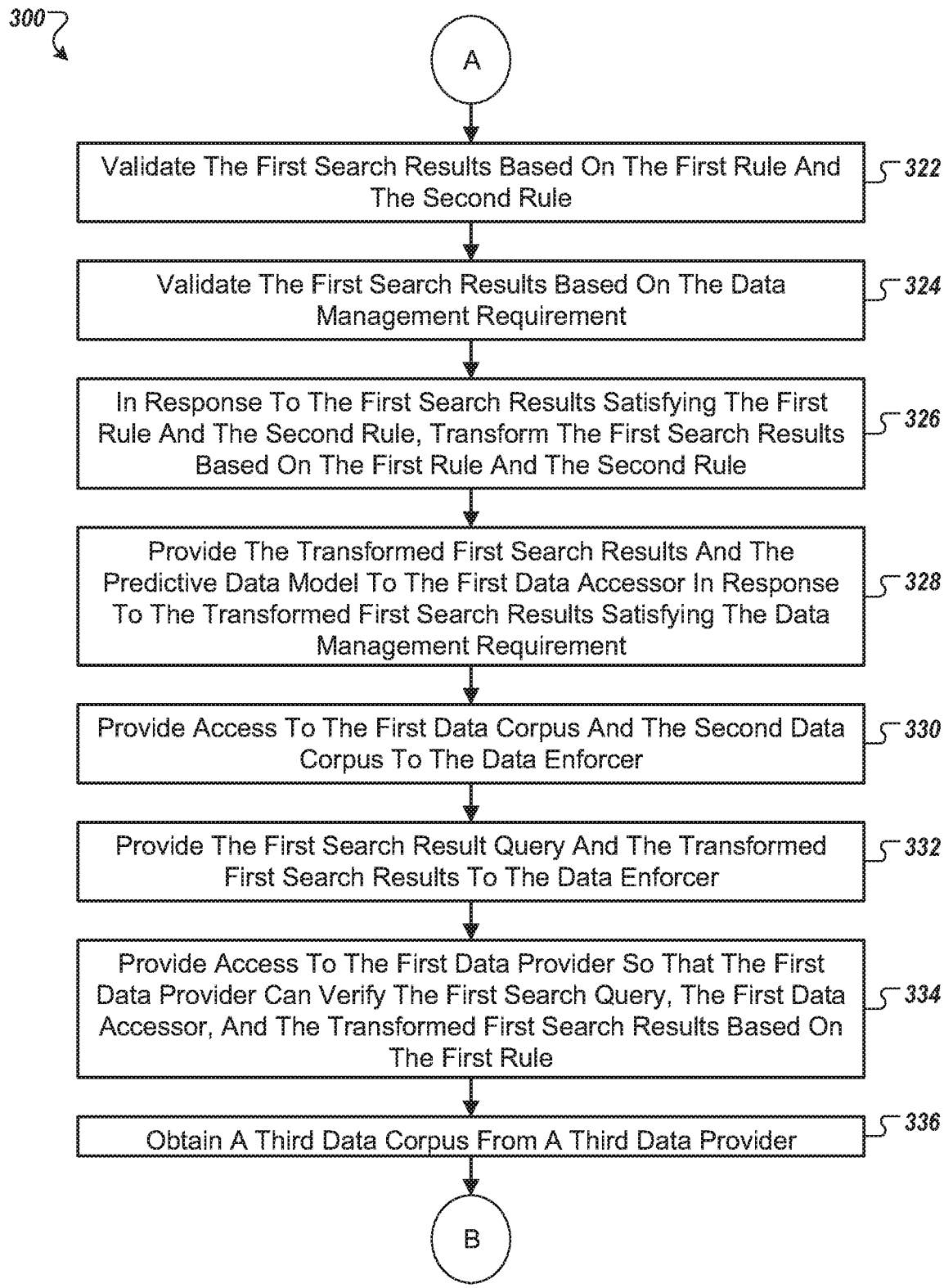
Figure 3C:
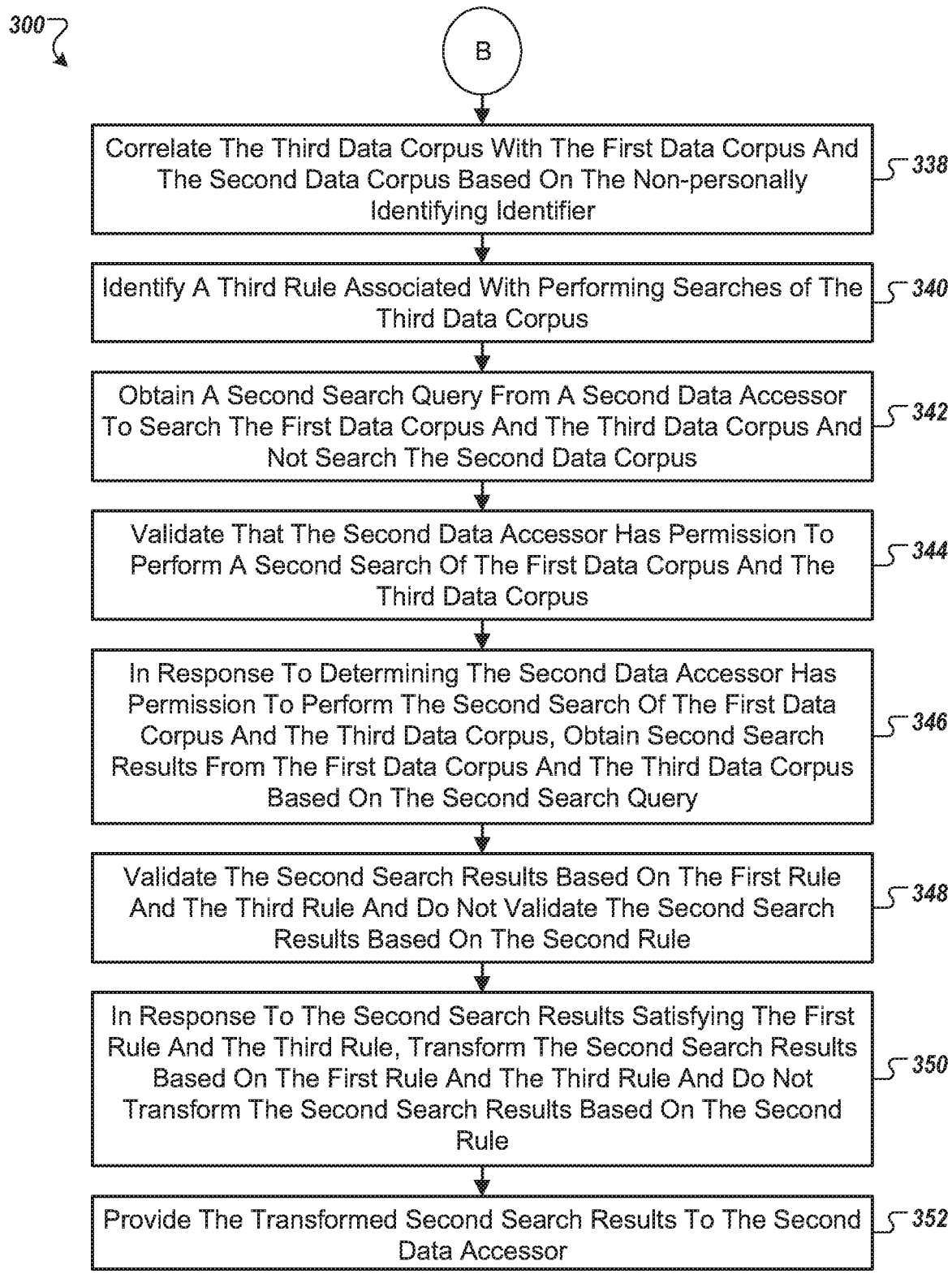

FIGS. 3A-3C illustrate an example flow diagram illustrating a method 300 for performing a search of an electronic multi-tenant data management system. The method may be performed by a circuit and/or processing logic that comprises hardware (e.g., circuitry, dedicated logic, programmable logic, microcode, etc.), software (e.g., instructions run on a processor to perform hardware simulation), or a combination thereof. Processing logic can control or interact with one or more devices, applications or user interfaces, or a combination thereof, to perform operations described herein. When presenting, receiving or requesting information from a user, processing logic can cause the one or more devices, applications or user interfaces to present information to the user and to receive information from the user.

For simplicity of explanation, the method of FIGS. 3A-3C is illustrated and described as a series of operations. However, acts in accordance with this disclosure can occur in various orders and/or concurrently and with other operations not presented and described herein. Further, not all illustrated operations may be required to implement the methods in accordance with the disclosed subject matter. In addition, those skilled in the art will understand and appreciate that the methods could alternatively be represented as a series of interrelated states via a state diagram or events.

At block 302, processing logic may obtain a first data corpus from a first data provider and a second data corpus from a second data provider. At block 304, the processing logic may correlate the first data corpus with the second data corpus based on a non-personally identifying identifier. At block 306, the processing logic may identify a first rule associated with performing searches of the first data corpus. At block 308, the processing logic may identify a second rule associated with performing searches of the second data corpus. At block 310, the processing logic may identify a data management requirement. The data management requirement may be associated with a data enforcer. The data enforcer may be different from the first data provider and the second data provider.

At block 312, the processing logic may obtain a first search query from a first data accessor to search the first data corpus and the second data corpus. At block 314, the processing logic may validate that the first data accessor has permission to perform a first search of the first data corpus and the second data corpus. At block 316, the processing logic may, in response to determining the first data accessor has permission to perform the first search of the first data corpus and the second data corpus, obtain first search results from the first data corpus and the second data corpus based on the first search query. At block 318, the processing logic may validate the first search results based on the first rule and the second rule. At block 320, the processing logic may validate the first search results based on the data management requirement. At block 322, the processing logic may, in response to the first search results satisfying the first rule and the second rule, transform the first search results based on the first rule and the second rule. At block 324, the processing logic may provide the transformed first search results to the first data accessor in response to the transformed first search results satisfying the data management requirement.

At block 326, the processing logic may provide access to the first data corpus and the second data corpus to the data enforcer. At block 328, the processing logic may provide the first search query and the transformed first search results to the data enforcer. At block 330, the processing logic may provide access to the first data provider so that the first data provider can verify the first search query, the first data accessor, and the transformed first search results based on the first rule.

At block 332, the processing logic may obtain a third data corpus from a third data provider. At block 334, the processing logic may correlate the third data corpus with the first data corpus and the second data corpus based on the non-personally identifying identifier. At block 336, the processing logic may identify a third rule associated with performing searches of the third data corpus. At block 338, the processing logic may obtain a second search query from a second data accessor to search the first data corpus and the third data corpus and not search the second data corpus. At block 340, the processing logic may validate that the second data accessor has permission to perform a second search of the first data corpus and the third data corpus.

At block 342, the processing logic may, in response to determining the second data accessor has permission to perform the second search of the first data corpus and the third data corpus, obtain second search results from the first data corpus and the third data corpus based on the second search query. At block 344, the processing logic may validate the second search results based on the first rule and the third rule and may not validate the second search results based on the second rule. At block 346, the processing logic may, in response to the second search results satisfying the first rule and the third rule, transform the second search results based on the first rule and the third rule and may not transform the second search results based on the second rule. At block 348, the processing logic may provide the transformed second search results to the second data accessor.

Figure 4:
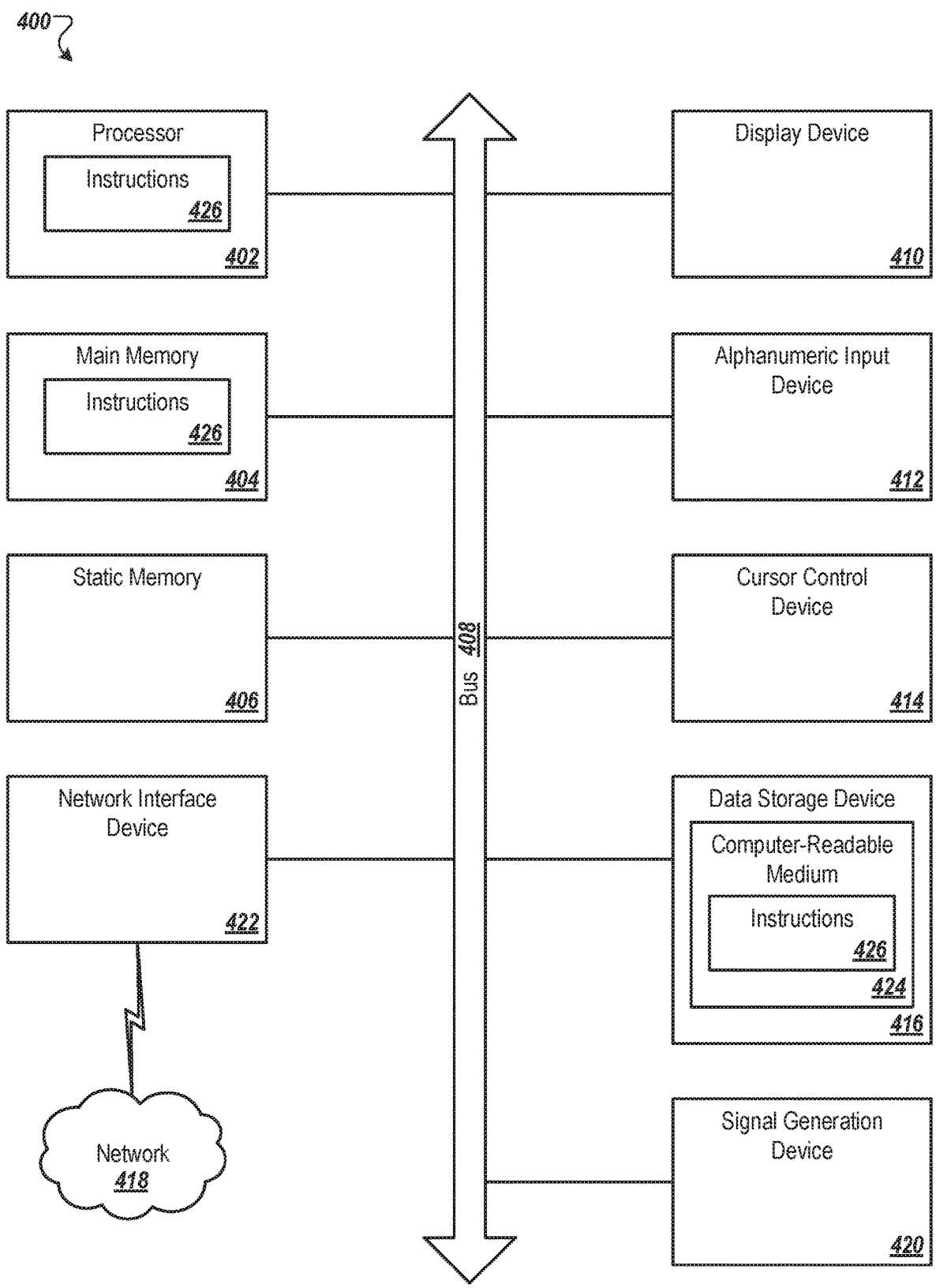
FIG. 4 illustrates an example computing device that may be used with an electronic multi-tenant data management system.

FIG. 4 illustrates a diagrammatic representation of a machine in the example form of a computing device 400 within which a set of instructions, for causing the machine to perform any one or more of the methodologies discussed herein, may be executed. The computing device 400 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a PC, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 also may include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In one implementation, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methodologies or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 424 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "obtaining," "correlating," "determining," "validating," "receiving," "generating," "transforming," "requesting," "creating," "uploading," "adding," "presenting," "removing," "preventing," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a computer selectively activated or reconfigured by a computer program stored in the computer. Such a computer program may be stored in a non-transitory computer readable storage medium, such as, but not limited to, any type of disk including floppy disks, optical disks, compact disc read-only memories (CD-ROMs) and magnetic-optical disks, ROMs, RAMs, erasable programmable read-only memories (EPROMs), electrically erasable programmable read-only memories (EEPROMs), magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   obtaining a first data corpus from a first data provider and a second data corpus from a second data provider;
   correlating the first data corpus with the second data corpus based on a non-personally identifying identifier;
   identifying a first rule associated with performing searches of the first data corpus;
   identifying a second rule associated with performing searches of the second data corpus;
   obtaining a first search query from a first data accessor to search the first data corpus and the second data corpus;
   validating that the first data accessor has permission to perform a first search of the first data corpus and the second data corpus;
   in response to determining the first data accessor has permission to perform the first search of the first data corpus and the second data corpus, obtaining first search results from the first data corpus and the second data corpus based on the first search query;
   validating the first search results based on the first rule and the second rule;
   in response to the first search results satisfying the first rule and the second rule, transforming the first search results based on the first rule and the second rule;
   providing the transformed first search results to the first data accessor;
   obtaining a third data corpus from a third data provider;
   correlating the third data corpus with the first data corpus and the second data corpus based on the non-personally identifying identifier;
   identifying a third rule associated with performing searches of the third data corpus;
   obtaining a second search query from a second data accessor to search the first data corpus and the third data corpus and not search the second data corpus;
   validating that the second data accessor has permission to perform a second search of the first data corpus and the third data corpus;
   in response to determining the second data accessor has permission to perform the second search of the first data corpus and the third data corpus, obtaining second search results from the first data corpus and the third data corpus based on the second search query;
   validating the second search results based on the first rule and the third rule and not validating the second search results based on the second rule;
   in response to the second search results satisfying the first rule and the third rule, transforming the second search results based on the first rule and the third rule and not transforming the second search results based on the second rule; and
   providing the transformed second search results to the second data accessor.

2. The method of claim 1, further comprising: identifying a data management requirement, the data management requirement being associated with a data enforcer, the data enforcer being different from the first data provider and the second data provider; and validating the first search results based on the data management requirement, wherein providing the transformed first search results to the first data accessor comprises providing the transformed first search results to the first data accessor in response to the transformed first search results satisfying the data management requirement.

3. The method of claim 2, further comprising:
   providing access to the first data corpus and the second data corpus to the data enforcer; and
   providing the first search query and the transformed first search results to the data enforcer.

4. The method of claim 1, wherein correlating the first data corpus with the second data corpus based on the non-personally identifying identifier comprises: identifying a first group of data in the first data corpus associated with a particular non-personally identifying identifier; identifying a second group of data in the second data corpus associated with the particular non-personally identifying identifier; and correlating the first group of data in the first data corpus with the second group of data in the second data corpus.

5. The method of claim 1, further comprising: providing access to the first data provider so that the first data provider can verify the first search query, the first data accessor, and the transformed first search results based on the first rule.

6. The method of claim 1, wherein the first rule is a first minimum bin aggregation rule and the second rule is a second minimum bin aggregation rule, the first minimum bin aggregation rule being greater than the second minimum bin aggregation rule and wherein validating the first search results based on the first rule and the second rule comprises validating the first search results based on the first rule.

7. A non-transitory computer-readable medium having encoded therein programming code executable by a processor to perform operations comprising:
obtaining a first data corpus from a first data provider and a second data corpus from a second data provider;
correlating the first data corpus with the second data corpus based on a non-personally identifying identifier;
identifying a first rule associated with performing searches of the first data corpus;
identifying a second rule associated with performing searches of the second data corpus;
obtaining a first search query from a first data accessor to search the first data corpus and the second data corpus;
validating that the first data accessor has permission to perform a first search of the first data corpus and the second data corpus;
in response to determining the first data accessor has permission to perform the first search of the first data corpus and the second data corpus, obtaining first search results from the first data corpus and the second data corpus based on the first search query;
validating the first search results based on the first rule and the second rule;
in response to the first search results satisfying the first rule and the second rule, transforming the first search results based on the first rule and the second rule;
providing the transformed first search results to the first data accessor;
obtaining a third data corpus from a third data provider;
correlating the third data corpus with the first data corpus and the second data corpus based on the non-personally identifying identifier;
identifying a third rule associated with performing searches of the third data corpus;
obtaining a second search query from a second data accessor to search the first data corpus and the third data corpus and not search the second data corpus;
validating that the second data accessor has permission to perform a second search of the first data corpus and the third data corpus;
in response to determining the second data accessor has permission to perform the second search of the first data corpus and the third data corpus, obtaining second search results from the first data corpus and the third data corpus based on the second search query;
validating the second search results based on the first rule and the third rule and not validating the second search results based on the second rule;
in response to the second search results satisfying the first rule and the third rule, transforming the second search results based on the first rule and the third rule and not transforming the second search results based on the second rule; and
providing the transformed second search results to the second data accessor.

8. The non-transitory computer-readable medium of claim 7, wherein the operations further comprise:
identifying a data management requirement, the data management requirement being associated with a data enforcer, the data enforcer being different from the first data provider and the second data provider; and
validating the first search results based on the data management requirement,
wherein providing the transformed first search results to the first data accessor comprises providing the transformed first search results to the first data accessor in response to the transformed first search results satisfying the data management requirement.

9. The non-transitory computer-readable medium of claim 8, wherein the operations further comprise:
providing access to the first data corpus and the second data corpus to the data enforcer; and
providing the first search query and the transformed first search results to the data enforcer.

10. The non-transitory computer-readable medium of claim 7, wherein correlating the first data corpus with the second data corpus based on the non-personally identifying identifier comprises:
identifying a first group of data in the first data corpus associated with a particular non-personally identifying identifier;
identifying a second group of data in the second data corpus associated with the particular non-personally identifying identifier; and
correlating the first group of data in the first data corpus with the second group of data in the second data corpus.

11. The non-transitory computer-readable medium of claim 7, wherein the operations further comprise:
providing access to the first data provider so that the first data provider can verify the first search query, the first data accessor, and the transformed first search results based on the first rule.

12. The non-transitory computer-readable medium of claim 7, wherein the first rule is a first minimum bin aggregation rule and the second rule is a second minimum bin aggregation rule, the first minimum bin aggregation rule being greater than the second minimum bin aggregation rule and wherein validating the first search results based on the first rule and the second rule comprises validating the first search results based on the first rule.

13. A system comprising
one or more processors; and
one or more computer-readable media configured to store instructions that in response to being executed by the one or more processors cause the system to perform operations, the operations comprising:
obtaining a first data corpus from a first data provider and a second data corpus from a second data provider;
correlating the first data corpus with the second data corpus based on a non-personally identifying identifier;
identifying a first rule associated with performing searches of the first data corpus;
identifying a second rule associated with performing searches of the second data corpus;
obtaining a first search query from a first data accessor to search the first data corpus and the second data corpus;
validating that the first data accessor has permission to perform a first search of the first data corpus and the second data corpus;

in response to determining the first data accessor has permission to perform the first search of the first data corpus and the second data corpus, obtaining first search results from the first data corpus and the second data corpus based on the search query;

validating the first search results based on the first rule and the second rule;

in response to the first search results satisfying the first rule and the second rule, transforming the first search results based on the first rule and the second rule;

providing the transformed first search results to the first data accessor;

obtaining a third data corpus from a third data provider;

correlating the third data corpus with the first data corpus and the second data corpus based on the non-personally identifying identifier;

identifying a third rule associated with performing searches of the third data corpus;

obtaining a second search query from a second data accessor to search the first data corpus and the third data corpus and not search the second data corpus;

validating that the second data accessor has permission to perform a second search of the first data corpus and the third data corpus;

in response to determining the second data accessor has permission to perform the second search of the first data corpus and the third data corpus, obtaining second search results from the first data corpus and the third data corpus based on the second search query;

validating the second search results based on the first rule and the third rule and not validating the second search results based on the second rule;

in response to the second search results satisfying the first rule and the third rule, transforming the second search results based on the first rule and the third rule and not transforming the second search results based on the second rule; and providing the transformed second search results to the second data accessor.

14. The system of claim 13, wherein the operations further comprise:

identifying a data management requirement, the data management requirement being associated with a data enforcer, the data enforcer being different from the first data provider and the second data provider; and validating the first search results based on the data management requirement, wherein providing the transformed first search results to the first data accessor comprises providing the transformed first search results to the first data accessor in response to the transformed first search results satisfying the data management requirement.

15. The system of claim 13, wherein correlating the first data corpus with the second data corpus based on the non-personally identifying identifier comprises:

identifying a first group of data in the first data corpus associated with a particular non-personally identifying identifier;

identifying a second group of data in the second data corpus associated with the particular non-personally identifying identifier; and correlating the first group of data in the first data corpus with the second group of data in the second data corpus.

16. The system of claim 13, wherein the operations further comprise:

providing access to the first data provider so that the first data provider can verify the first search query, the first data accessor, and the transformed first search results based on the first rule.

17. The system of claim 13, wherein the first rule is a first minimum bin aggregation rule and the second rule is a second minimum bin aggregation rule, the first minimum bin aggregation rule being greater than the second minimum bin aggregation rule and wherein validating the first search results based on the first rule and the second rule comprises validating the first search results based on the first rule.

* * * * *